US012547410B2

United States Patent
Belkar et al.

(10) Patent No.: US 12,547,410 B2
(45) Date of Patent: Feb. 10, 2026

(54) REMOTE DIRECT MEMORY ACCESS COMMUNICATION METHOD IN A NETWORK AND CORRESPONDING CONTROLLER

(71) Applicant: HUAWEI TECHNOLOGIES CO., LTD., Shenzhen (CN)

(72) Inventors: Ben-Shahar Belkar, Hod Hasharon (IL); David Ganor, Hod Hasharon (IL); Amit Geron, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 18/360,632

(22) Filed: Jul. 27, 2023

(65) Prior Publication Data

US 2023/0367601 A1 Nov. 16, 2023

Related U.S. Application Data

(63) Continuation of application No. PCT/EP2021/051832, filed on Jan. 27, 2021.

(51) Int. Cl.
*G06F 9/38* (2018.01)
*G06F 9/48* (2006.01)

(52) U.S. Cl.
CPC .......... *G06F 9/3838* (2013.01); *G06F 9/4881* (2013.01)

(58) Field of Classification Search
CPC ....... G06F 9/3838; G06F 9/4881; G06F 13/28
See application file for complete search history.

(56) References Cited

U.S. PATENT DOCUMENTS

| | | | |
|---|---|---|---|
| 11,531,622 B2* | 12/2022 | Simionescu | G06F 12/084 |
| 2002/0169935 A1* | 11/2002 | Krick | G06F 12/0831 |
| | | | 711/158 |
| 2011/0185102 A1* | 7/2011 | Deogharia | G06F 13/4059 |
| | | | 711/E12.001 |
| 2015/0286570 A1* | 10/2015 | Guthrie | G06F 12/128 |
| | | | 711/122 |
| 2015/0331607 A1* | 11/2015 | McCarthy | G06F 3/0659 |
| | | | 711/103 |
| 2016/0065659 A1 | 3/2016 | Bloch et al. | |
| 2018/0188997 A1* | 7/2018 | Fleming, Jr. | G06F 9/3838 |
| 2020/0145725 A1* | 5/2020 | Eberle | H04N 21/2387 |

* cited by examiner

*Primary Examiner* — Farley Abad
(74) *Attorney, Agent, or Firm* — Leydig, Voit & Mayer, Ltd.

(57) ABSTRACT

A method processes data requests from a requester to a responder over a network by using remote direct memory access. The method includes the requester issuing two or more requests into a work queue of a network interface controller. The method further includes the network interface controller executing the queued requests by sending them to the responder, and receiving responses to the sent request from the responder. One or more given requests each includes dependency information related to the response from the responder to one or more previous requests in the work queue, the method further includes, before executing the given request by the network interface controller, evaluating the dependency information and executing the given request depending on the result of the evaluation.

18 Claims, 6 Drawing Sheets

REMOTE DIRECT MEMORY ACCESS COMMUNICATION METHOD IN A NETWORK AND CORRESPONDING CONTROLLER

CROSS-REFERENCE TO RELATED APPLICATIONS

This application is a continuation of International Application No. PCT/EP2021/051832, filed on Jan. 27, 2021, the disclosure of which is hereby incorporated by reference in its entirety.

FIELD

Embodiments of the present disclosure relate to the field of data communication, and more specifically, to a remote direct memory access communication method in a network, and a corresponding controller.

BACKGROUND

Presently, Remote Direct Memory Access (RDMA) is a technology that is widely used in datacentres and computer-clusters for data communication in order to have low-latency and high-bandwidth networking. The RDMA offloads memory operations from a Central Processing Unit (CPU) of a computer, for example, in a computer cluster, to a Remote Network Interface Controller (RNIC), which directly accesses the memory to execute the RDMA memory operations. Examples of RDMA memory operations include read, write or atomic operations. The offloading from memory operations saves the CPU time, and enables the CPU to perform other tasks.

Typically, in RDMA communication, a software-layer (i.e., an upper application layer) uses "verbs" software application programming interfaces (APIs) to perform the RDMA memory operations, which are then transformed to work-requests which are written to a queue in the RNIC. Each of the work-request may be referred to as a work queue element (WQE). Every WQE is independent of other WQEs, except for the order in which the WQEs are written to the queue. In fact, the "verbs" API calls may be converted by RDMA middleware to the WQEs, which are sent to the RNIC for processing. The RNIC's processing offloads the main CPU from handling the RDMA memory operations by itself, and reduces the upper-application layer's CPU-cycles requirements. However, the upper application layer is still responsible for tracking and processing the results of the RDMA memory operations it issues, to initiate new RDMA memory operations. Alternatively stated, the upper application layer processes and evaluates the results of previous request in order to determine what the next requests to be performed are. However, the upper application layer consumes CPU cycles for this processing and execution of software for determining the next request is slower and strictly serialized due to the need to wait for completion of the previous request and its result, before continuing. In an example, multiple requests cannot be issued together. As a result, a higher latency of operations, from upper application layer point-of-view is obtained. Further, this makes data communication more computational resource intensive and increases memory utilization.

Therefore, there exists a need to overcome the aforementioned drawbacks associated with conventional data communication involving Remote Direct Memory Access (RDMA).

SUMMARY

Embodiments of the present disclosure provide a method and a controller for processing data requests from a requester to a responder over a network by using remote direct memory access. Embodiments of the present disclosure provide a solution to the existing problem of high latency and CPU intensive data communication involving RDMA due to the ineffective upper application layer processing, where results of previous request are first processed and there is a need to wait for completion of the previous request in order to determine what are the next requests to be performed. Embodiments of the present disclosure provide a solution that overcomes at least partially the problems encountered in prior art, and provide improved method and system that provide lower latency and lesser CPU intensive data communication as compared to conventional RDMA systems by enabling a conditional and dynamic dependency between two or more requests (i.e., WQEs) or between a one request and itself in case of request retry on failure.

In one aspect, embodiments of the present disclosure provide a method for processing data requests from a requester to a responder over a network by using remote direct memory access, the method comprising the requester issuing two or more requests into a work queue of a network interface controller, the network interface controller executing the queued requests by sending them to the responder, and receiving responses to the sent request from the responder, wherein one or more given requests each comprises dependency information related to the response from the responder to one or more previous requests in the work queue, the method further comprising, before executing the given request by the network interface controller, evaluating the dependency information and executing the given request depending on the result of the evaluation.

The method of the present disclosure provides improved data communication involving reduced CPU cycles and lower latency as compared to conventional RDMA systems. The method enables in creating a conditional dependency between the two or more requests. As a result, two or more requests can be issued together. Conventionally, an upper application layer processes and evaluates the results of previous request in order to determine what are the next requests to be performed which consumes considerable CPU cycles. However, in the present disclosure, the upper application layer is offloaded as the network interface controller is responsible for evaluating the dependence information and for the execution of the requests. The CPU (such as CPU of the requester) which was conventionally employed for processing, tracking, and executing the requests is free for other tasks making the method less resource intensive in comparison to conventional methods.

In an implementation form, in the method, the dependency information comprises one or more request identifiers for identifying the one or more previous requests in the work queue, and a condition information to be evaluated.

By virtue of the one or more request identifiers the one or more previous requests can be identified explicitly or implicitly for execution of the request (i.e. a present request). The condition information enables in identifying conditions associated with one or more previous requests.

In a further implementation form, in the method, the condition information comprises one or more data locations and one or more operations to be executed on a data located at one of the data locations in the result(s) of one or more of the previous requests identified respectively by the request identifiers.

The one or more data locations enable in identification of the data in the result(s) of one or more previous requests which is used for execution of the one or more operations.

In a further implementation form, in the method, at least one of the operations in the condition information includes deriving values from the data located at one of the data locations in the result of one of the identified previous requests, or from a combination of data located at one or more of the data locations in the result(s) of one or more of the identified previous requests, to be used for the execution of the corresponding given request.

The data identified at the one or more data locations is derived to enable execution of the given request which is dependent on the one or more previous request.

In a further implementation form, in the method, the condition information comprises one or more values, to be used in one or more of the operations.

The one or more values are used during the execution of the operation, with respect to the derived values from the data locations in the identified previous requests.

In a further implementation form, in the method, at least one of the operations in the condition information includes a comparison to be performed on a data located at one of the data locations in the result of one of the identified previous requests, or on a combination of data located at one or more of the data locations in the result(s) of one or more of the identified previous requests, with respect to one of the values in the condition information, or a combination of two or more of the values in the condition information.

By virtue of the comparison, the method enables in identification of whether the data in the results of previous requests is similar to value in the condition information, based on which the given request which is dependent on previous request is executed.

In a further implementation form, in the method, a request (WQE1, WQE2) comprising dependency information is queued into the work queue of the network interface controller, the dependency information is extracted from both the dependent request and from a previous request dependent upon and stored in a dependency information database.

The dependency information is extracted and stored in the dependency information database to enable execution of the at least one operation.

In a further implementation form, in the method, when receiving the response to a given request from a responder, the network interface controller queries the dependency information database for dependency information comprising the identifier of the given request, and store the data in the response, located in the response at the data location comprised in the queried dependency information, into a dependency response data memory in the network interface controller and/or into a dependency response data memory allocated to the network controller in a host.

The response to the given request from the responder is stored in a way to be associated with the identifier of the given request to enable execution of the at least one operation between the response and one or more values stored previously.

In a further implementation form, in the method, evaluating the dependency information of a given request comprises querying the dependency information database for dependency information of the given request, obtaining the data stored into the dependency response data memory corresponding to the result of execution of the previous requests whose identifier is comprised in the queried dependency information, and executing the operations comprised in the queried dependency information on the obtained data.

The querying of the dependency information database is easier as the dependency information is stored based on the identifier of the request. The data stored into the dependency response data memory is obtained to enable execution of the operation of this data with the dependency information.

In a further implementation form, in the method, evaluating the dependency information is performed at least partially by the network interface controller.

The evaluation of the dependency information by the network interface controller enables in offloading the CPU of the requester, thereby saving CPU time and enabling CPU to be free to perform other tasks.

In another aspect, embodiments of the present disclosure provide a controller for processing data requests from a requester to a responder over a network by using remote direct memory access, the controller being configured to accept two or more requests (WQE1, WQE2) issued by the requester into a work queue, execute the queued requests (WQE1, WQE2) by sending them to the responder, and receive responses to the former sent request from the responder, wherein one or more given requests each comprises dependency information related to the response from the responder to one or more previous requests in the work queue, the controller being further configured to evaluate, at least partially, before executing the given request, the dependency information and execute the given request depending on the result of the evaluation.

The controller of the present disclosure provides improved data communication involving reduced CPU cycles and lower latency. The controller enables in creating a conditional dependency between the two or more requests. As a result, two or more requests can be issued together. Conventionally, an upper application layer processes and evaluates the results of previous request in order to determine what the next requests to be performed are, which consumes considerable CPU cycles. However, in the present disclosure, the upper application layer is offloaded as the controller is responsible for evaluating the dependence information and for the execution of the requests. The CPU (such as CPU of the requester) which was conventionally employed for processing and executing the requests is free for other tasks.

In another aspect, embodiments of the present disclosure provide a requester for sending data requests to a responder through a controller over a network by using remote direct memory access, the requester being configured to issue two or more requests (WQE1, WQE2) into a work queue of the controller to be executed by the controller by sending them to the responder and receiving responses to the sent request (WQE1, WQE2) from the responder, the requester being further configured to issue one or more given requests so that it comprises dependency information related to the response from the responder to one or more previous requests in the work queue, the dependency information being aimed at being evaluated, before execution of the given request, so that the execution of the given request being dependent on the result of the evaluation.

The requester of the present disclosure provides improved data communication involving reduced CPU cycles and lower latency. The requester enables in creating a conditional dependency between the two or more requests. As a result, two or more requests can be issued together. Conventionally, an upper application layer processes and evaluates the results of previous request in order to determine what the next requests to be performed are, which consumes considerable CPU cycles. However, in the present disclosure, the upper application layer is offloaded as the controller is responsible for evaluating the dependence information and for the execution of the requests. The CPU (such as CPU of the requester) which was conventionally employed for processing and executing the requests is free for other tasks.

It is to be appreciated that all the aforementioned implementation forms can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

BRIEF DESCRIPTION OF THE DRAWINGS

For the purpose of illustrating embodiments of the present disclosure, exemplary constructions of the embodiments are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
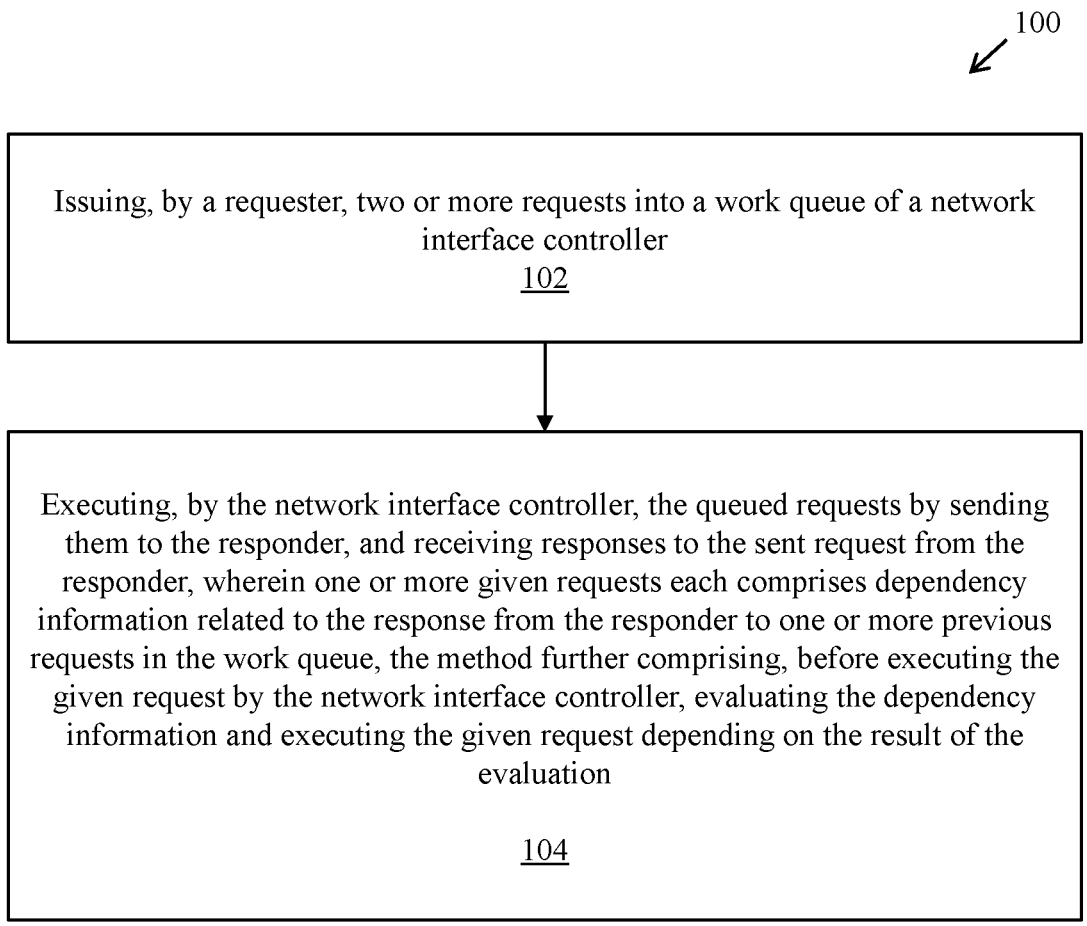
FIG. 1 is a flowchart of a method for processing data requests from a requester to a responder over a network by using remote direct memory access, in accordance with an embodiment of the present disclosure.

FIG. 1 is a flowchart of a method for processing data requests from a requester to a responder over a network by using remote direct memory access, in accordance with an embodiment of the present disclosure. With reference to FIG. 1 there is shown the method 100. The method 100 is executed at a controller described, for example, in FIG. 2. The method 100 includes steps 102 and 104.

In one aspect, the present disclosure provides a method 100 for processing data requests from a requester to a responder over a network by using remote direct memory access, the method 100 comprising
the requester issuing two or more requests into a work queue of a network interface controller,
the network interface controller executing the queued requests by sending them to the responder, and receiving responses to the sent request from the responder,
wherein one or more given requests each comprises dependency information related to the response from the responder to one or more previous requests in the work queue, the method 100 further comprising, before executing the given request by the network interface controller, evaluating the dependency information and executing the given request depending on the result of the evaluation.

The method 100 enables processing data requests from a requester to a responder over a network by using remote direct memory access. The remote direct memory access (RDMA) is used in datacentres and computer clusters involving requesters and responders to enable low-latency and high-bandwidth networking while processing data requests. The method 100 comprises processing data requests (such as read data, write data) provided by the requester to the responder.

At step 102, the method 100 comprises the requester issuing two or more requests into a work queue of a network interface controller. The two or more requests are issued by the requester into the work queue to enable execution of the requests in defined sequence. The work queue refers to a log of all the requests that are issued by the requester to enable ordered identification of the request for execution. The network interface controller (NIC) is configured to use the remote direct memory access for executing the two or more requests. Beneficially, the remote direct memory access offloads memory operations from a Central Processing Unit (CPU) of the requester to the network interface controller. This offloading saves CPU time and the CPU is free to perform other tasks.

In an example, 'verbs' software API is used to perform remote direct memory access operations, and write the two or more requests to the work queue of the network interface controller. Each of the two or more requests in the work queue may be referred to as a work queue element (WQE). The work queue elements are for tagged (one-sided write/read/atomic) operations and for untagged (two-sided send/receive) operations.

At step 104, the method 100 comprises the network interface controller executing the queued requests by sending them to the responder, and receiving responses to the sent request from the responder. The network interface controller is configured to execute the requests based on the work queue. In an example, the network interface controller sends an atomic request to the responder and further receives an atomic response based on the atomic request from the responder. Atomic request refers to request for execution of a memory operation (for example of 64 bits) at a specific address on the responder. Atomic requests may be used to read, modify, and write memory at the specific address.

One or more given requests each comprises dependency information related to the response from the responder to one or more previous requests in the work queue, the method 100 further comprising, before executing the given request by the network interface controller, evaluating the dependency information and executing the given request depending on the result of the evaluation. The dependency information associated with one or more given requests enables in establishing a dependency of one or more given requests on one or more previous requests. In an example, a conditional and dynamic dependency is created between two requests (such as a given request and a previous request). As a result, two or more requests may be issued simultaneously based on the evaluation of the dependency information. In comparison to conventional data communication where results of one or more previous requests are processed to determine the next requests for execution and there is a need to wait for results of the one or more previous requests. Beneficially, the method 100 of the present disclosure is faster and less computer intensive on the CPU of the requester in comparison to conventional data communication where execution of request is slower and strictly serialized due to the need to wait for completion of a request and its result, and also for analysis and manipulation of this result in view of posting the next request, before continuing and consuming higher CPU cycles.

In an example, the dependency information comprises execution of one or more requests only if previous request's 32 bits value equals a defined value, or only if write/read/atomic operation address of previous request's 64 bits value equals a defined value or only if write/read/atomic operation address, length and remote key of previous request's 128 bits value equals a defined value. In another example, the dependency information comprises changing destination host (i.e., a responder) due to previous read/atomic operation, this will move the WQE to a different Send Queue (SQ) of a different Queue Pair (QP) and the data will be sent to a different target, for example, when the controller reads the location of a target storage it will direct the next WQE to a QP that is connected to that host.

According to an embodiment, the dependency information comprises one or more request identifiers for identifying the one or more previous requests in the work queue, and a condition information to be evaluated. By virtue of the one or more request identifiers, the one or more previous requests can be identified explicitly or implicitly for execution of the request (i.e. a present request). The condition information enables in identifying conditions associated with one or more previous requests. In an example, the request identifiers to the one or more previous requests can be explicit, by using a unique identifier assigned to the previous request. In another example, the request identifiers to the one or more previous requests can be implicit, by indicating the distance between the current, dependent request and the one request it depends on: i.e. 'a previous request or 'a 5th previous request'. Multiple requests could be dependent on the same request and a request can depend on a request which is already dependent on another request. Conventionally, an upper application layer processes and tracks the responses of previous requests in order to determine what are the next requests to perform. In the present method 100, as an example of implementation, when the upper application layer issues a request, the upper application layer gets back a unique identifier for the request, for example named 'opid'. The 'opid' may be a Work Queue Element Identifier (WQE-ID), assigned by the RDMA middleware. Further, when the upper application layer is issuing another request, the upper application layer defines an execution dependence on the previous request, identified by respective 'opid' of the other request. The condition information to be evaluated refers to one or more conditions associated with one or more previous requests on which one or more requests are dependent.

According to an embodiment, the condition information comprises one or more data locations and one or more operations to be executed on a data located at one of said data location in the result(s) of one or more of the previous requests identified respectively by said request identifiers. The one or more data locations in the one or more of the previous requests may include an offset value and an offset length. In an example, the one or more data locations includes a byte-offset and a byte-length such as 1, 2, 4, 8, 16. The one or more data locations enable in identification of the data in the result(s) of one or more previous requests which is used for execution of the one or more operations. In other words, the one or more operations are executed based on the data at the one or more data locations. In an example, when the condition information is processed, the condition information may be distributed and include information of the one or more previous requests, resulting with the condition information being associated with one or more previous requests.

According to an embodiment, at least one of the operations in the condition information includes deriving values from the data located at one of the data locations in the result of one of the identified previous requests, or from a combination of data located at one or more of the data locations in the result of one or more of the identified previous requests, to be used for the execution of the corresponding given request. The data identified at the one or more data locations is derived to enable execution of the given request which is dependent on the one or more previous request. In an example, the values from the data located at one of the data locations is derived based on the offset value and the offset length. Further, such values may be bitwise masked with an optional mask value. The masking of values enables ease in identification of the value at the data location. Further the values from the data locations may be stored in the network interface controller, and/or into an allocated memory in a host.

According to an embodiment, the condition information comprises one or more values, to be used in one or more of the operations. The one or more values may be pre-stored which are used during the execution of the operation, with respect to the derived values from the data locations in the identified previous requests.

According to an embodiment, at least one of the operations in the condition information includes a comparison to be performed on a data located at one of the data locations in the result of one of the identified previous requests, or on a combination of data located at one or more of the data locations in the result of one or more of the identified previous requests, with respect to one of the values in the condition information, or a combination of two or more of the values in the condition information. By virtue of the comparison, the method enables in identification of whether the data in the results of previous requests is similar to value in the condition information, based on which the given request which is dependent on previous request is executed. In an example, the method 100 comprises comparing the value in the condition information to the data located in the one or more data locations of the identified previous requests. If the result of the comparison is TRUE, the operation is executed. If the result of the comparison is FALSE, then an error is reported. Further, when the result of comparison is FALSE, the dependent operation is skipped, or the queue pair (QP) is suspended, or the queue pair is stopped. Further, when the result of comparison is FALSE, dependent request (i.e. the previous request) can be retried an indicated number of times, before aborting and reporting an error. Further, when the result of comparison is FALSE, both the depended-upon request (i.e. the previous request) and the dependent request (i.e. the request dependent on previous request) can be retired an indicated number of times, before aborting and reporting an error. The operations of comparison can use any of the following relations: equal (=), different (!=), larger than (>), smaller than (<), larger than or equal (>=), smaller than or equal (<=), bitwise-not (^) and the like. The combination of data located at one of the data locations in the result of one or more of the identified previous requests may include different data locations in a single request, same data location in different requests, different data locations in different requests, same data location for some requests, and other data locations for other requests.

According to an embodiment, at least one of the operations in the condition information includes an integration. In this operation, derived values from previous request are used as parameters for the current request. Derived values could fill in parameters such as destination-Queue Pair (QP), Virtual Address (VA), Remote Key (R_Key) and the like.

According to an embodiment, in case the controller cannot store the dependency information, a new 'no dependence resource' error, or an existing equivalent one, is reported. In case a dependent request is issued, and it references a previous request that was already completed and/or it references a previous request whose response is no longer stored, a new 'dependence reference error', or an equivalent existing one, is reported. In case an error is discovered during execution of a request, that has other requests depending upon, then an error state is set in all dependent requests. In an example, a new error code "dependence cannot be evaluated" error is defined and reported for each such depending request.

According to an embodiment, when a request (WQE1, WQE2) comprising dependency information is queued into the work queue of the network interface controller, said dependency information is extracted from both the dependent request and from a previous request dependent upon and stored in a dependency information database. The request WQE1 refers to a first work queue element and the request WQE2 refers to a second work queue element. The dependency information may be stored along with the unique identifier of the request (WQE1, WQE2). The dependency information is extracted and stored in the dependency information database to enable execution of the at least one operation. The dependency information database may be stored in the network interface controller or the requester host or both.

According to an embodiment, when receiving the response to a given request from a responder, the network interface controller queries the dependency information database for dependency information comprising the identifier of the given request, and store the data in the response, located in said response at the data location comprised in the queried dependency information, into a dependency response data memory in the network interface controller. For caching purpose, this data in the response, located in said response at the data location comprised in the queried dependency information, can also, or alternatively, be stored into a dependency response data memory allocated to the network interface controller in a host. The response to the given request from the responder is stored in a way to be associated with the identifier of the given request to enable execution of the at least one operation (such as comparison) between the response and one or more values stored previously.

According to an embodiment, evaluating the dependency information of a given request comprises querying the dependency information database for dependency information of the given request, obtaining the data stored into the dependency response data memory corresponding to the result of execution of the previous requests whose identifier is comprised in the queried dependency information, and executing the operations comprised in the queried dependency information on the obtained data. The querying of the dependency information database is easier as the dependency information is stored based on the identifier of the request. The data stored into the dependency response data memory is obtained to enable execution of the operation (for example comparison) of this data (of the previous request) with the dependency information (of the given request).

According to an embodiment, evaluating the dependency information is performed at least partially by the network interface controller. The evaluation of the dependency information by the network interface controller using the remote direct memory access enables in offloading the CPU of the requester and saving CPU time and enabling CPU to be free to perform other tasks.

According to an embodiment, evaluating the dependency information is performed at least partially by the requester. The evaluation of the dependency information is performed partially by the requester (CPU of the requester) while the rest evaluation is performed by the network interface controller. The CPU of the requester is partially offloaded and CPU time is saved to perform other tasks.

According to an embodiment, when network interface controller supports advanced functions on payloads, then clauses of dependence information can also reference such functions. In an example, in write-hash, the network interface controller reads local data from the memory (for example dependency response data memory), calculates hash function result, on-the-fly, and writes only the hash function's result. In another example, in read-hash, a network interface controller of responder reads data from the memory, calculates hash function result, on-the-fly, and responds only with hash function's result. In another example, in compare-buffer, the network interface controller sends data to responder, which the network interface controller of the responder compares to the indicated memory and the result (exactly equals or not) is returned to the requester. The network interface controller's embedded payload functions are hardware accelerators, tightly couples with the network interface controller's hardware. These accelerators enable significant offloading of the main CPU's (requester CPU) operations.

Conventionally, an upper application layers issues a read operation, waits for data to arrive, calculates the hash function on data, and then issues a new write operation with the hash value as payload. In the present disclosure, with dependent information, both operations are issued together, while specifying that the second operation is to calculate the embedded hash function on the read data, on-the-fly, and write the result data to the memory.

In an alternative embodiment, processing of a clause (i.e., a portion) in dependency information of an operation can be performed by the RDMA middleware, thus a data-structure of WQE is not modified. In another alternative embodiment, processing of a clause in dependency information of an operation can be divided between hardware of network interface controller, firmware of the network interface controller and middleware of the RDMA. In another alternative embodiment, processing of a clause in dependency information can change the values of parameters of a WQE in an RQ (Receive Queue), so that processing the response of a SQ (Send Queue) of WQE affects the content of a WQE already posted to an RQ. For example, in order to change to destination memory buffers of a future inbound send operation. In another alternative embodiment, an operation can be dependent on multiple previous operations.

The method 100 of the present disclosure provides improved data communication involving reduced CPU cycles and lower latency. The method 100 enables in creating a conditional dependency between the two or more requests. As a result, two or more requests can be issued together. Conventionally, an upper application layer processes and evaluates the results of previous request in order to determine what are the next requests to be performed which consumes considerable CPU cycles. However, in the present disclosure, the upper application layer is offloaded as the network interface controller is responsible for evaluating the dependence information and for the execution of the requests. The CPU (such as CPU of the requester) which was conventionally employed for processing and executing the requests is free for other tasks making the method less resource intensive in comparison to conventional methods.

The steps 102 and 104 are only illustrative and other alternatives can also be provided where one or more steps are added, one or more steps are removed, or one or more steps are provided in a different sequence without departing from the scope of the claims herein.

Figure 2:
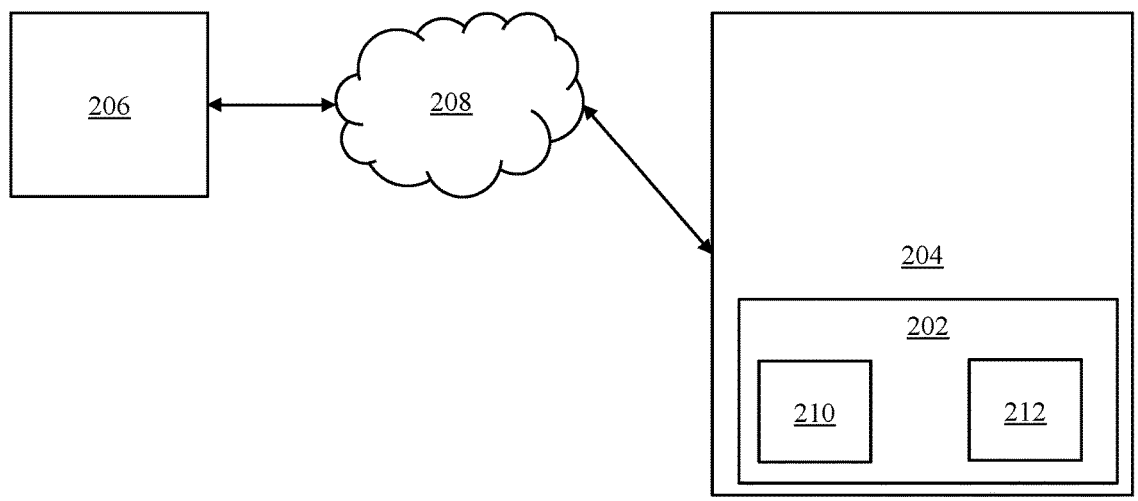
FIG. 2 is a block diagram of a controller for processing data requests from a requester to a responder over a network by using remote direct memory access, in accordance with an embodiment of the present disclosure.

FIG. 2 is a block diagram of a controller for processing data requests from a requester to a responder over a network by using remote direct memory access, in accordance with an embodiment of the present disclosure. With reference to FIG. 2, there is shown the controller 202. There is further shown a requester 204, a responder 206 and a network 208. As can be seen in FIG. 2, the requester 204 and the controller 202 are on the same node or endpoint in the network, so that they do not communicate with each other over the network. Typically, as shown in FIG. 2, the controller 202 is part of the requester 204.

In another aspect, the present disclosure provides a controller 202 for processing data requests from a requester 204 to a responder 206 over a network 208 by using remote direct memory access, the controller 202 being configured to accept two or more requests (WQE1, WQE2) issued by the requester 204 into a work queue, execute the queued requests (WQE1, WQE2) by sending them to the responder 206, and receive responses to the former sent request from the responder 206, wherein one or more given requests each comprises dependency information related to the response from the responder 206 to one or more previous requests in the work queue, the controller 202 being further configured to evaluate, at least partially, before executing the given request, the dependency information and execute the given request depending on the result of the evaluation.

The controller 202 also referred to as a network interface controller (NIC) is a remote direct memory access (RDMA) enabled network interface controller. The controller 202 is configured to use the remote direct memory access for processing and executing the two or more requests from the requester 204. In an example, the controller 202 may provide support for the remote direct memory access over Transmission Control Protocol (TCP) suite. Beneficially, the remote direct memory access offloads memory operations from a Central Processing Unit (CPU) of the requester 204 to the controller 202. This offloading saves CPU time and the CPU is free to perform other tasks.

The requester 204 includes a suitable logic, circuitry, interfaces, and/or code that is configured to provide requests (such as WQE1, WQE2) to the responder 206 over a network 208. The requester 204 may be associated with (or used by) a user. Examples of requester 204 include, but are not limited to, cellular phones, personal digital assistants (PDAs), handheld devices, wireless modems, laptop computers, personal computers and the like. Examples of requester 204 may further include, a mobile station, a mobile terminal, a subscriber station, a remote station, a user terminal, a terminal, a subscriber unit, an access terminal and the like.

The responder 206 includes a suitable logic, circuitry, interfaces, and/or code that is configured to receive requests (such as WQE1, WQE2) from the requester 204 and provide response based on the request over the network 208. The responder 206 may be associated with (or used by) a user. Examples of responder 206 include, but are not limited to, cellular phones, personal digital assistants (PDAs), handheld devices, wireless modems, laptop computers, personal computers and the like. Examples of responder 206 may further include, a mobile station, a mobile terminal, a subscriber station, a remote station, a user terminal, a terminal, a subscriber unit, an access terminal and the like.

The network 208 includes a suitable logic, circuitry, interfaces, and/or code that is configured to facilitate data communication between the requester 204 and the responder 206. Furthermore, the network 208 may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the network 208 includes wired or wireless communication that can be carried out via any number of known protocols, including, but not limited to, Internet Protocol (IP), Wireless Access Protocol (WAP), Frame Relay, or Asynchronous Transfer Mode (ATM).

In operation, the controller 202 is configured to accept two or more requests (WQE1, WQE2) issued by the requester 204 into a work queue. The two or more requests are accepted by the controller 202 into the work queue to enable execution of the requests in defined sequence. The work queue stores the log of all the requests (the WQE1, WQE2 and subsequent requests) that are issued by the requester 204 to enable ordered identification of the request for execution.

The controller 202 is further configured to execute the queued requests (WQE1, WQE2) by sending them to the responder 206, and receive responses to the former sent request from the responder 206. One or more given requests each comprises dependency information related to the response from the responder 206 to one or more previous requests in the work queue, the controller 202 being further configured to evaluate, at least partially, before executing the given request, the dependency information and execute the given request depending on the result of the evaluation. The controller 202 is configured to execute the requests based on the work queue. In an example, the controller 202 sends an atomic request to the responder 206 and further receives an atomic response based on the atomic request from the responder 206. The dependency information associated with one or more given requests enables in establishing a dependency of one or more given requests on one or more previous requests. In an example, a conditional and dynamic dependency is created between two requests (such as a given request and a previous request). As a result, two or more requests may be issued simultaneously based on the evaluation of the dependency information. In comparison to conventional data communication where results of one or more previous requests are processed to determine the next requests for execution and there is a need to wait for results of the one or more previous requests.

According to an embodiment, the dependency information comprises one or more request identifiers for identifying the one or more previous requests in the work queue, and a condition information, the controller 202 being configured to evaluate, at least partially, the condition information. By virtue of the one or more request identifiers the one or more previous requests can be identified explicitly or implicitly for execution of the request (i.e. a present request). The condition information enables in identifying conditions associated with one or more previous requests. In an example, the request identifiers to the one or more previous requests can be explicit, by using a unique identifier assigned to the previous request. In another example, the request identifiers to the one or more previous requests can be implicit, by indicating the distance between the current, dependent request and the one request it depends on; i.e. 'a previous request or 'a 5th previous request. Multiple requests could be dependent on the same request and a request can depend on a request which is already dependent on another request. The at least partial evaluation by the controller 202 enables in offloading the CPU of the requester 204.

According to an embodiment, the condition information comprises one or more data locations and one or more operations to be executed on a data located at one of said data location in the result(s) of one or more of the previous requests identified respectively by said request identifiers, the controller 202 being configured to execute at least partially said one or more operations. The one or more data locations enable in identification of the data in the result(s) of one or more previous requests which is used for execution of the one or more operations. The one or more data locations in the one or more of the previous requests may include an offset value and an offset length. The one or more operations are executed by the controller 202 based on the data at the one or more data locations. In an example, when the condition information is processed by the controller 202, the condition information may be distributed and include information of the one or more previous requests, resulting with the condition information being associated with one or more previous requests.

According to an embodiment, at least one of the operations in the condition information includes deriving values from the data located at one of the data locations in the result of one of the identified previous requests, or from a combination of data located at one or more of the data locations in the result(s) of one or more of the identified previous requests, to be used for the execution of the corresponding given request. The data identified at the one or more data locations is derived to enable execution of the given request which is dependent on the one or more previous request. In an example, the values from the data located at one of the data locations is derived based on the offset value and the offset length. Further, such values may be bitwise masked with an optional mask value. The masking of values enables ease in identification of the value at the data location by the controller 202. Further the values from the data locations may be stored in the controller 202.

According to an embodiment, the condition information comprises one or more values, to be used in one or more of the operations. The one or more values may be pre-stored which are used during the execution of the operation by the controller 202, with respect to the derived values from the data locations in the identified previous requests.

According to an embodiment, at least one of the operations in the condition information includes a comparison to be performed on a data located at one of the data locations in the result of one of the identified previous requests, or on a combination of data located at one or more of the data locations in the result of one or more of the identified previous requests, with respect to one of the values in the condition information, or a combination of two or more of the values in the condition information. By virtue of the comparison the controller 202 enables in identification of whether the data in the results of previous requests is similar to value in the condition information, based on which the given request which is dependent on previous request is executed. In an example, the controller 202 is configured to compare the value in the condition information to the data located in the one or more data locations of the identified previous requests. If the result of the comparison is TRUE, the operation is executed by the controller 202. If the result of the comparison is FALSE, then an error is reported by the controller 202.

According to an embodiment, the controller 202 is further configured to store, in a dependency information database 210, dependency information extracted from one or more requests (WQE1, WQE2) comprising said dependency information and queued into the work queue of the controller 202. The dependency information may be stored along with the unique identifier of the request (WQE1, WQE2). The dependency information is extracted and stored in the dependency information database 210 to enable execution of the at least one operation by the controller 202. The dependency information database 210 may be stored in the controller 202 or the requester 204 or both, or stored in the controller 202 and duplicated on the requester 204.

According to an embodiment, the controller 202 is further configured to query the dependency information database 210 for dependency information comprising the identifiers of given requests, when receiving the responses to said given requests from a responder 206, and to store the data in the responses, located in said responses at the data locations comprised in the queried dependency information, into a dependency response data memory 212.

The dependency response data memory 212 is shown in the controller 202 in the figures. However, it can also be located into a host, as a memory of this host allocated to the controller 202. The data in the received responses can also be stored both in a dependency response data memory 212 in the controller 202 and in a dependency response data memory allocated to the controller 202 in a host.

The response to the given request from the responder 206 is stored by the controller 202 in a way to be associated with the identifier of the given request to enable execution of the at least one operation (such as comparison) between the response and one or more values stored previously.

According to an embodiment, the controller 202 is further configured, when evaluating the dependency information of a given request, to query the dependency information database 210 for dependency information of the given request, to obtain the data stored into the dependency response data memory 212 corresponding to the result of execution of the previous requests whose identifiers are comprised in the queried dependency information, and to execute the operations comprised in the queried dependency information on the obtained data. The querying of the dependency information database 210 is easier as the dependency information is stored based on the identifier of the request. The data stored into the dependency response data memory 212 is obtained by the controller 202 to enable execution of the operation (for example comparison) of this data (of the previous request) with the dependency information (of the given request).

The controller of the present disclosure provides improved data communication involving reduced CPU cycles and lower latency. The controller enables in creating a conditional dependency between the two or more requests. As a result, two or more requests can be issued together. Conventionally, an upper application layer processes and evaluates the results of previous request in order to determine what are the next requests to be performed which consumes considerable CPU cycles. However, in the present disclosure, the upper application layer is offloaded as the controller is responsible for evaluating the dependence information and for the execution of the requests. The CPU (such as CPU of the requester) which was conventionally employed for processing and executing the requests is free for other tasks.

Figure 3:
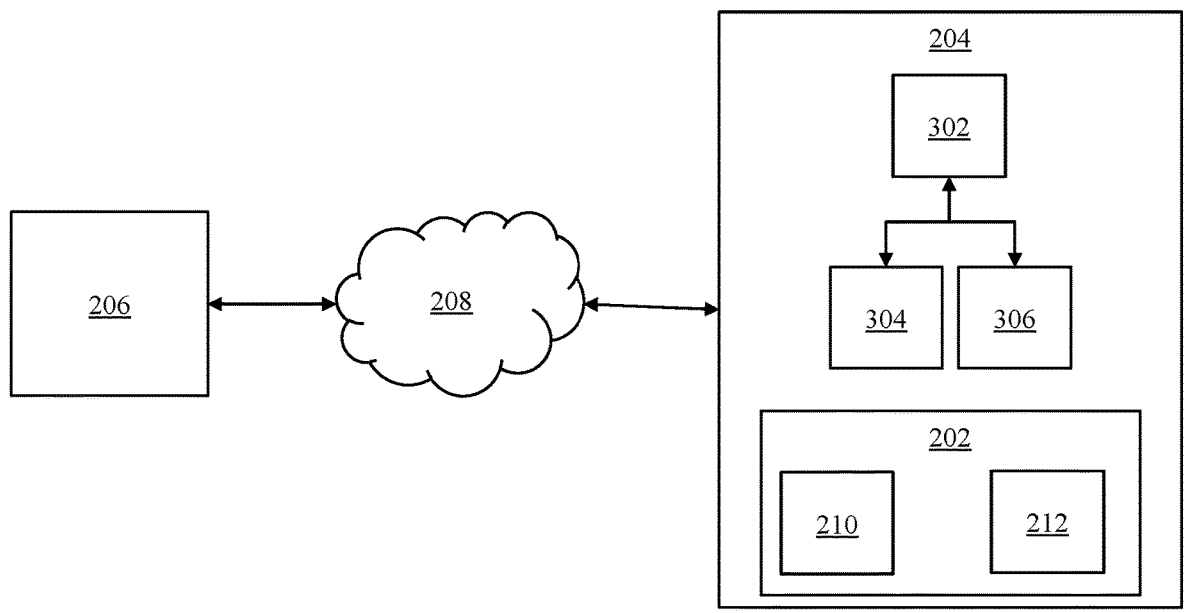
FIG. 3 is a block diagram of a requester for sending data requests to a responder through a controller over a network by using remote direct memory access, in accordance with an embodiment of the present disclosure.

FIG. 3 is a block diagram of a requester for sending data requests to a responder through a controller over a network by using remote direct memory access, in accordance with an embodiment of the present disclosure. FIG. 3 is described in conjunction with FIG. 2. With reference to FIG. 3 there is shown the requester 204. The requester 204 includes a processor 302, a transceiver 304 and a memory 306. There is further shown the controller 202, the responder 206 and the network 208. As can be seen in FIG. 3, the requester 204 and the controller 202 are on the same node or endpoint in the network, so that they do not communicate with each other over the network. Typically, as shown in FIG. 2, the controller 202 is part of the requester 204.

In another aspect, the present disclosure provides, a requester 204 for sending data requests to a responder 206 through a controller 202 over a network 208 by using remote direct memory access, the requester 204 being configured to issue two or more requests (WQE1, WQE2) into a work queue of the controller 202 to be executed by said controller 202 by sending them to the responder 206 and receiving responses to the sent request (WQE1, WQE2) from the responder 206, the requester 204 being further configured to issue one or more given requests so that it comprises dependency information related to the response from the responder 206 to one or more previous requests in the work queue, said dependency information being aimed at being evaluated, before execution of the given request, so that said execution of the given request being dependent on the result of the evaluation.

The processor 302 is configured to issue two or more requests (WQE1, WQE2) into the work queue. In an implementation, the processor 302 is configured to execute instructions stored in the memory 306. In an example, the processor 302 may be a general-purpose processor. Other examples of the processor 302 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry.

The transceiver 304 includes suitable logic, circuitry, and interfaces that may be configured to communicate with the controller 202. Examples of the transceiver 304 may include, but is not limited to, an antenna, a radio frequency (RF) transceiver, one or more amplifiers, one or more oscillators, a digital signal processor, a coder-decoder (CODEC) chipset, or a subscriber identity module (SIM) card.

The memory 306 refers to a primary storage of the requester 204. Examples of implementation of the memory 306 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), or CPU cache memory. The memory 306 may store an operating system or other program products (including one or more operation algorithms) to operate the requester 204.

In operation, the processor 302 is configured to issue two or more requests (WQE1, WQE2) into a work queue of the controller 202 to be executed by said controller 202 by sending them to the responder 206 and receiving responses to the sent requests (WQE1, WQE2) from the responder 206. The two or more requests are issued by the processor 302 into the work queue to enable execution of the requests in defined sequence. The controller 202 is configured to execute the requests based on the work queue. In an example, the controller 202 sends an atomic request to the responder 206 and further receives an atomic response based on the atomic request from the responder 206.

The processor 302 of the requester 204 is further configured to issue one or more given requests so that it comprises dependency information related to the response from the responder 206 to one or more previous requests in the work queue, said dependency information being aimed at being evaluated, before execution of the given request, so that said execution of the given request being dependent on the result of the evaluation. The dependency information associated with one or more given requests enables in establishing a dependency of one or more given requests on one or more previous requests. As a result, two or more requests may be issued simultaneously based on the evaluation of the dependency information. In comparison to conventional data communication where results of one or more previous requests are processed to determine the next requests for execution and there is a need to wait for results of the one or more previous requests.

According to an embodiment, the controller 202 may be implemented in the requester 204.

According to an embodiment, the dependency information comprises one or more request identifiers for identifying the one or more previous requests in the work queue, and a condition information, the requester 204 being configured to evaluate at least partially the condition information. By virtue of the one or more request identifiers the one or more previous requests can be identified explicitly or implicitly for execution of the request (i.e. a present request). The condition information enables in identifying conditions associated with one or more previous requests. In an example, the request identifiers to the one or more previous requests can be explicit, by using a unique identifier assigned to the previous request. In another example, the request identifiers to the one or more previous requests can be implicit, by indicating the distance between the current, dependent request and the one request it depends on: i.e. 'a previous request or 'a 5th previous request'. Multiple requests could be dependent on the same request and a request can depend on a request which is already dependent on another request. The evaluation is partially evaluated by the requester 204 and the controller 202 to enable offloading of the processor 302 of the requester 204.

According to an embodiment, the condition information comprises one or more data locations and one or more operations to be executed on a data located at one of said data location in the result(s) of one or more of the previous requests identified respectively by said request identifiers, the requester 204 being configured to execute at least partially said one or more operations. The one or more data locations enable in identification of the data in the result(s) of one or more previous requests which is used for execution of the one or more operations. The one or more data locations in the one or more of the previous requests may include an offset value and an offset length. The one or more operations are executed based on the data at the one or more data locations. In an example, when the condition information is processed, the condition information may be distributed and include information of the one or more previous requests, resulting with the condition information being associated with one or more previous requests.

According to an embodiment, at least one of the operations in the condition information includes deriving values from the data located at one of the data locations in the result of one of the identified previous requests, or from a combination of data located at one or more of the data locations in the result of one or more of the identified previous requests, to be used for the execution of the corresponding given request. The data identified at the one or more data locations is derived to enable execution of the given request which is dependent on the one or more previous request. In an example, the values from the data located at one of the data locations is derived based on the offset value and the offset length. Further, such values may be bitwise masked with an optional mask value. The masking of values enables ease in identification of the value at the data location.

According to an embodiment, the condition information comprises one or more values, to be used in one or more of the operations. The one or more values may be pre-stored which are used during the execution of the operation, with respect to the derived values from the data locations in the identified previous requests.

According to an embodiment, at least one of the operations in the condition information includes a comparison to be performed on a data located at one of the data locations in the result of one of the identified previous requests, or on a combination of data located at one or more of the data locations in the result(s) of one or more of the identified previous requests, with respect to one of the values in the condition information, or a combination of two or more of the values in the condition information. By virtue of the comparison the requester 204 enables in identification of whether the data in the results of previous requests is similar to value in the condition information, based on which the given request which is dependent on previous request is executed. In an example, the present disclosure comprises comparing the value in the condition information to the data located in the one or more data locations of the identified previous requests. If the result of the comparison is TRUE, the operation is executed. If the result of the comparison is FALSE, then an error is reported.

The requester 204 of the present disclosure provides improved data communication involving reduced CPU cycles and lower latency. The requester 204 enables in creating a conditional dependency between the two or more requests. As a result, two or more requests can be issued together. Conventionally, an upper application layer processes and evaluates the results of previous request in order to determine what are the next requests to be performed which consumes considerable CPU cycles. However, in the present disclosure, the upper application layer is offloaded as the controller 202 is responsible for evaluating the dependence information and for the execution of the requests. The CPU (such as CPU of the requester 204) which was conventionally employed for processing and executing the requests is free for other tasks.

Figure 4A:
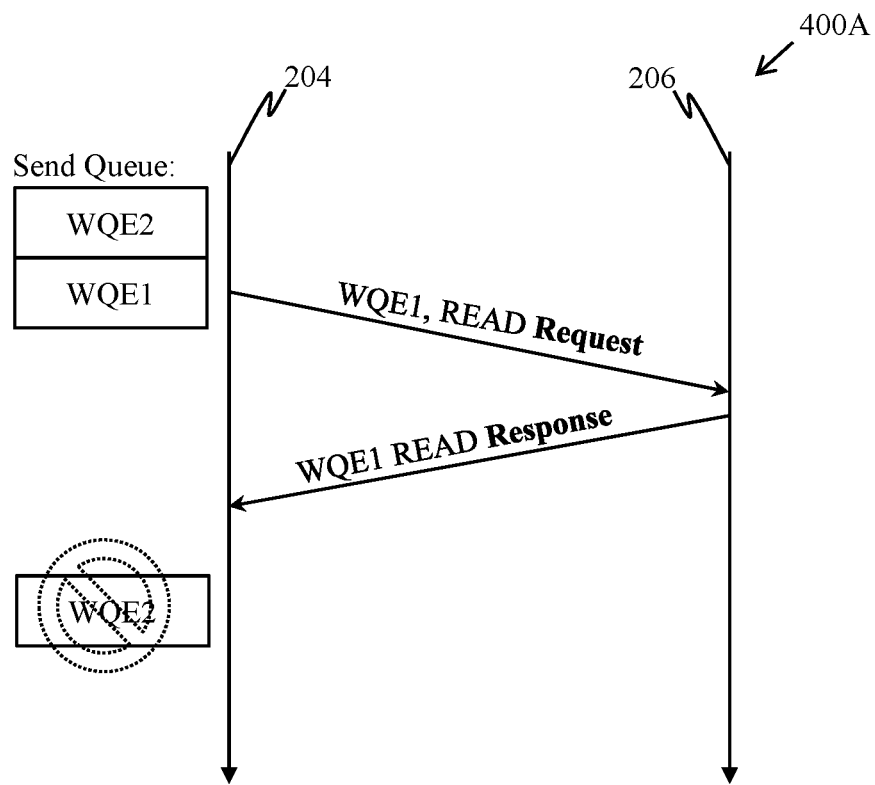
FIGS. 4A, 4B and 4C are exemplary implementations of a method for processing data requests from a requester to a responder over a network by using remote direct memory access, in accordance with various embodiment of the present disclosure.
Figure 4B:
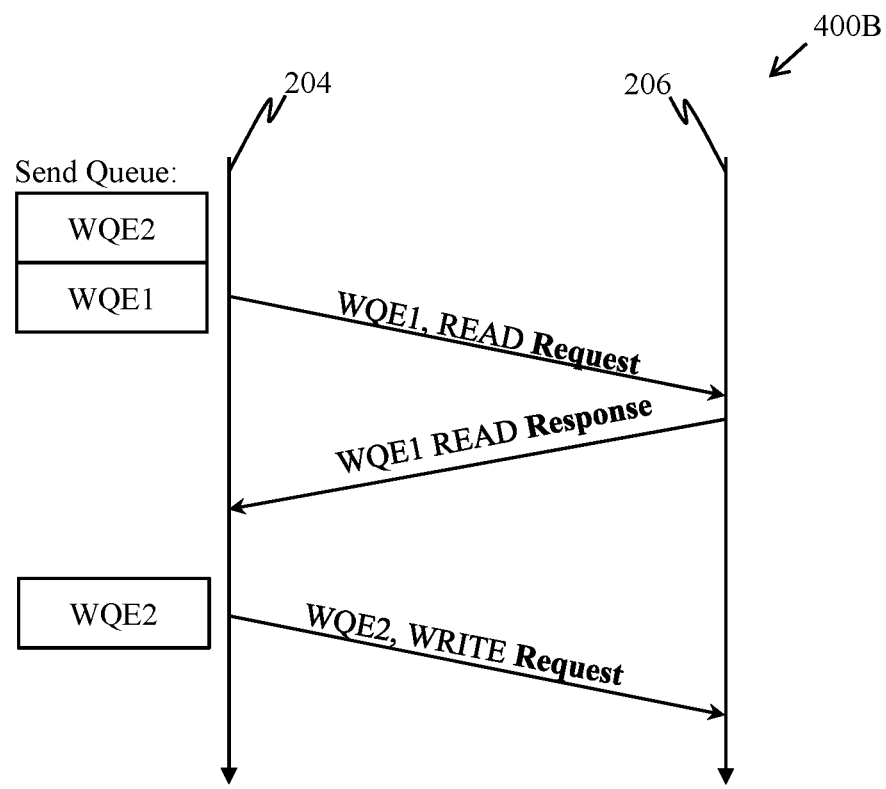

FIGS. 4A and 4B are exemplary implementations of a method for processing data requests from a requester to a responder over a network by using remote direct memory access, in accordance with different embodiment of the present disclosure. FIGS. 4A and 4B are described in conjunction with FIG. 2. With reference to FIGS. 4A and 4B there is shown the method 400A and 400B. There is shown the requester 204 and the responder 206.

The requester 204 is configured to issue two request i.e. a first request referred to as a work queue element one (WQE1) and a second request referred to as a work queue element second (WQE2). The WQE2 comprises dependency information related to response from responder 206 to WQE1. The dependency information includes the request identifier as WQE1 and condition information includes Operation: Compare with '=', Value: 0x12345678, Mask: 0xffffffff, Value's length: 4, Value's location: 1020. The WQE1 is a read operation of 1 Kbytes and the WQE2 is a write operation of 4 Bytes and is dependent on WQE1. The WQE2 is executed only if the last 4 Bytes in WQE1's payload equals the value 0x12345678. If it is not, WQE2 is aborted and a "completion with error" is returned for the WQE2.

Conventionally, an upper application layer needs to wait for the completion of previous request, read the response and only then decide whether to issue the next request. In the present disclosure, with dependent information both requests can be issued together, while specifying that the second request should be executed only if the first request for example first/last 32 bits value equals a specific value.

In the implementation of FIG. 4A, upon successfully completion of WQE1, the last 4 bytes are: 0x88990001 and hence WQE2 dependence is FALSE. WQE2 is not executed and an error is reported.

In the implementation of FIG. 4B, upon successfully completion of WQE1, the last 4 bytes are: 0x12345678 and hence WQE2 dependence is TRUE. WQE2 is executed in this implementation.

Figure 4C:
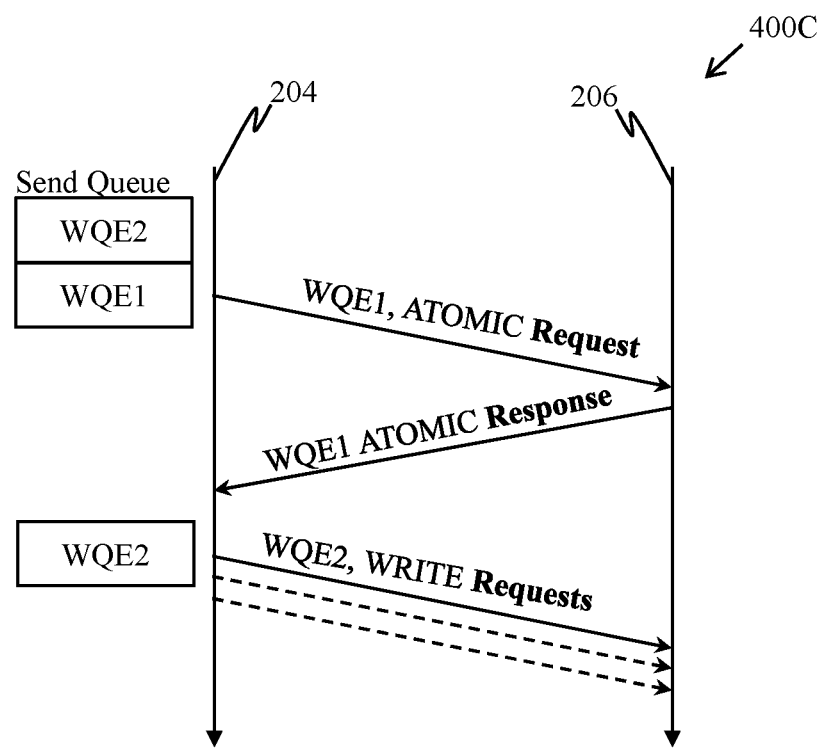

FIG. 4C is exemplary implementations of a method for processing data requests from a requester to a responder over a network by using remote direct memory access, in accordance with another embodiment of the present disclosure. FIG. 4C is described in conjunction with FIG. 2. With reference to FIG. 4C there is shown the method 400C. There is shown the requester 204 and the responder 206.

The requester 204 is configured to issue two request i.e. a first request referred to as a work queue element one (WQE1) and a second request referred to as a work queue element second (WQE2). The WQE2 comprises dependency information related to response from responder 206 to WQE1. The dependency information includes the request identifier as previous WQE and condition information includes Operation: Integrate virtual addresses (VA), Value's length: 8, Value's location: 0.

Conventionally, an upper application layer needs to issue a read/atomic operation, wait and process for the returned data and only then construct the new write/read/atomic operation. In the present disclosure, with dependency information both operations can be issued together, while specifying the second operation's parameters are set by the first one.

The WQE1 is an atomic operation. The WQE2 is a write operation of 100 MB (Megabytes) and is dependent on WQE1. The WQE2 destination VA address is not indicated and its value will be determined by the response of WQE1. In this implementation, upon successfully completion of WQE1, Response of WQE1 is: 0x2000100010008990000. The WQE2 VA set to: 0x2000100010008990000.

Figure 5:
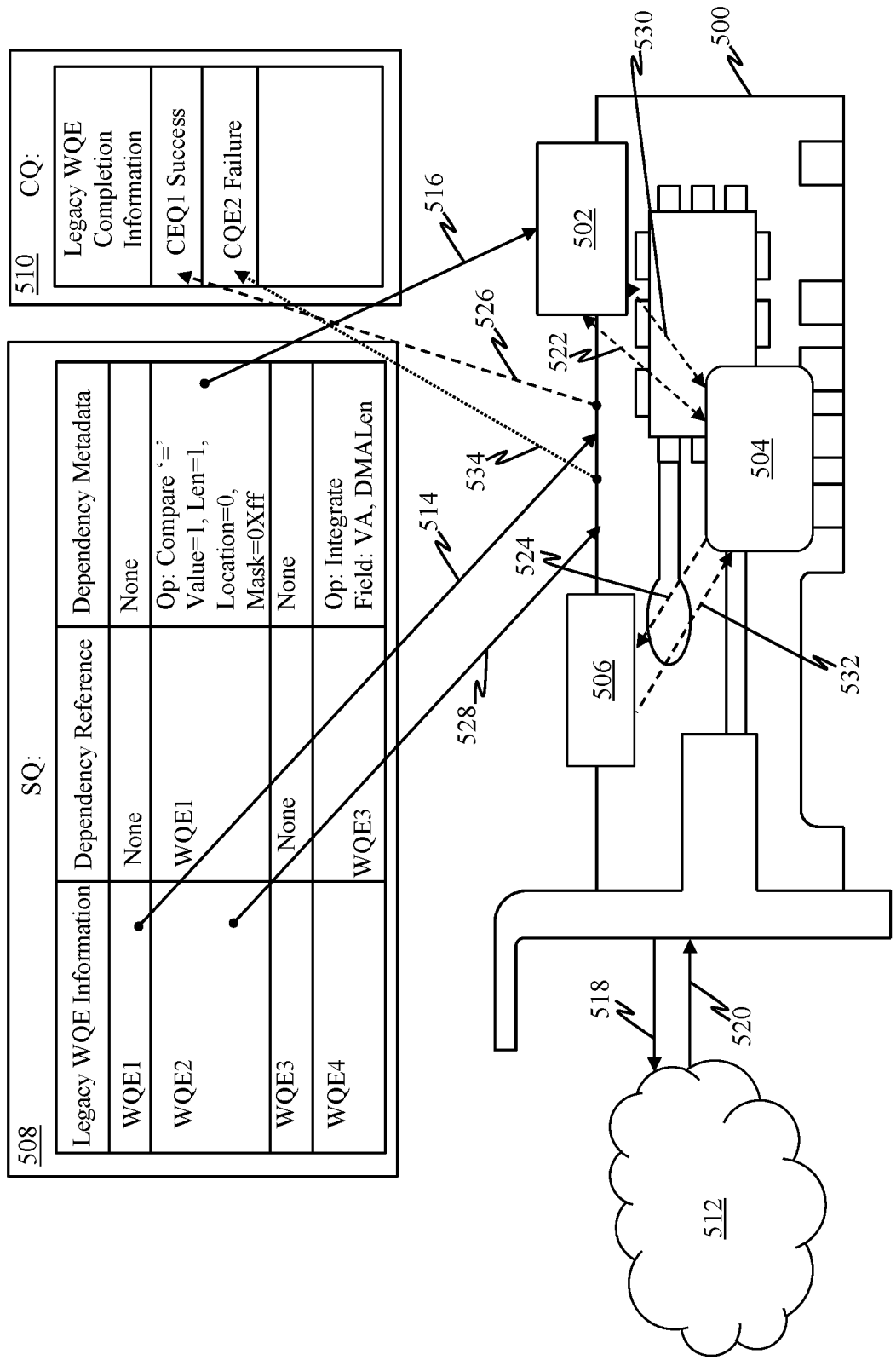
FIG. 5 is exemplary implementations of a method executed by a controller for processing data requests from a requester to a responder over a network by using remote direct memory access, in accordance with an embodiment of the present disclosure.

FIG. 5 is exemplary implementations of a method executed by a controller for processing data requests from a requester to a responder over a network by using remote direct memory access, in accordance with an embodiment of the present disclosure. With reference to FIG. 5 there is shown the controller 500. There is shown a dependency information database 502, a dependency response data memory 506 and a dependence evaluation engine 504. There is further shown a send queue 508 and a completion queue 510. There is further shown a network 512.

The dependency information database 502 may also be referred to as a dependence information table. The dependency response data memory 506 may also be referred to as a memory to store response's dependent data.

As already mentioned before, the dependency response data memory 506 can also be located, or duplicated, into a host, as a memory of this host allocated to the controller 500.

At step 514, a WQE1 (work queue element one) is scheduled for execution. At step 516, the controller 500 is notified that dependency metadata exists for this WQE1, so controller 500 fetches this information and stores it in dependency information database 502. At step 518, request packets of the WQE1 are transmitted to the network (and further to a responder which is not shown). At step 520, response packets of the WQE1 are received from the network (from a responder which is not shown). At step 522, the dependency evaluation engine 504 queries the dependency information database 502 for dependency information of the WQE1. At step 524, dependency evaluation engine 504 derives the indicated value from the response packets and stores it in the dependency response data memory 506. At step 526, the controller 500 notifies the successful completion of WQE1. At step 528, a WQE2 (work queue element two) is scheduled for execution. At step 530, the dependency evaluation engine 504 queries the dependency information database 502 for dependency information of the WQE2. At step 532, the dependency evaluation engine 504 gets the stored value from the dependency information database 502 and evaluates the condition. At step 534, condition evaluates to FALSE, hence the WQE2 is not executed and the controller 500 notifies a 'completion with error' of WQE2.

Figure 6:
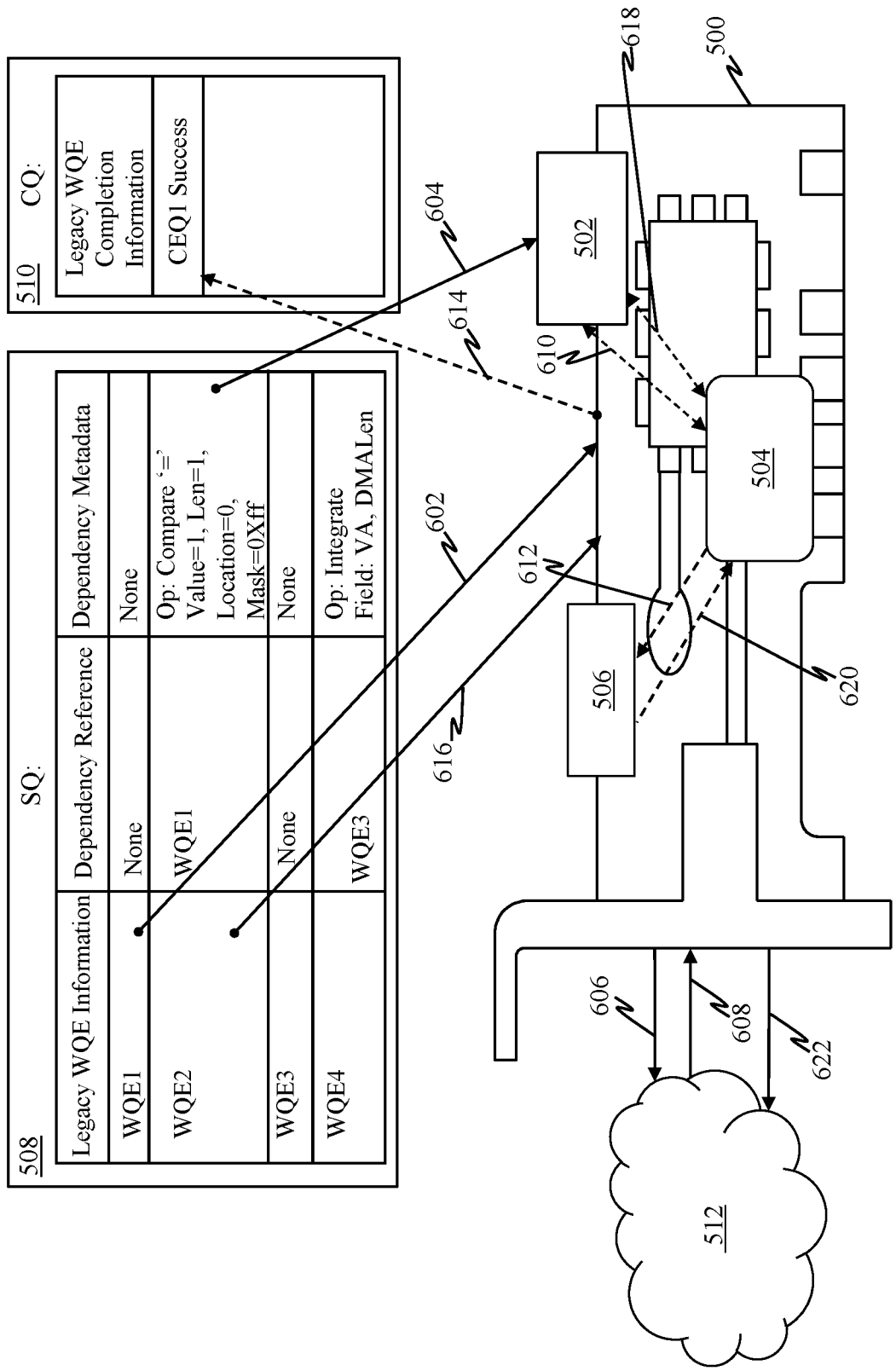
FIG. 6 is exemplary implementations of a method executed by a controller for processing data requests from a requester to a responder over a network by using remote direct memory access, in accordance with another embodiment of the present disclosure.

FIG. 6 is exemplary implementations of a method executed by a controller for processing data requests from a requester to a responder over a network by using remote direct memory access, in accordance with another embodiment of the present disclosure. FIG. 6 is described in conjunction with FIG. 5. With reference to FIG. 6 there is shown the controller 500. There is shown the dependency information database 502, the dependency response data memory 506 and the dependence evaluation engine 504. There is further shown the send queue 508 and the completion queue 510. There is further shown the network 512.

The dependency information database 502 may also be referred to as the dependence information table. The dependency response data memory 506 may also be referred to as the memory to store response's dependent data.

Here again, the dependency response data memory 506 can also be located, or duplicated, into a host, as a memory of this host allocated to the controller 500.

At step 602, a WQE1 (work queue element one) is scheduled for execution. At step 604, the controller 500 is notified that dependency metadata exists for this WQE1, so controller 500 fetches this information and stores it in dependency information database 502. At step 606, request packets of the WQE1 are transmitted to the network (and further to a responder which is not shown). At step 608, response packets of the WQE1 are received from the network (from a responder which is not shown). At step 610, the dependency evaluation engine 504 queries the dependency information database 502 for dependency information of the WQE1. At step 612, dependency evaluation engine 504 derives the indicated value from the response packets and stores it in the dependency response data memory 506. At step 614, the controller 500 notifies the successful completion of WQE1. At step 616, a WQE2 (work queue element two) is scheduled for execution. At step 618, the dependency evaluation engine 504 queries the dependency information database 502 for dependency information of the WQE2. At step 620, the dependency evaluation engine 504 gets the stored value from the dependency information database 502 and evaluates the condition. At step 622, condition evaluates to TRUE, hence the WQE2 is executed.

In an implementation of dependent execution at receiver side, headers and metadata inputs (such as dependency information) are received. Such headers and metadata inputs comprise a key, an action ID and an action data. In an example, key includes QP ID: 4, Opcode: AtomicAck (0x12), MSN: 2; action ID includes store; and action data includes AtomicAckETH value. In another example, key includes QP ID: 8, Opcode: Read Response First (0xD), MSN: 7; action ID includes compare and action data includes Size: 32 bit, Offset: 0. These action ID and action data are compared with default action ID and default action data. Further based on the comparison, action ID is sent to Action code and action data is sent to a Directional Action data parameters. The headers and metadata are sent to a Directional Data Plane parameters. Further, the Directional Data Plane parameters and the Directional Action data parameters are sent to the Action code. This Action code further provides headers and metadata as output.

In another implementation of dependent execution at transmitter side, WQE and metadata inputs (such as dependency information) are received. Such headers and metadata inputs comprise a key, an action ID and an action data. In an example, key includes QP ID: 4, Opid: 3; action ID includes compare (skip on fail/retry opid 2 on fail/use default destination on fail/error on fail); and action data includes AtomicAckETH value received by Opid 2. These action ID and action data are compared with default action ID and default action data. Further based on the comparison, action ID is sent to Action code and action data is sent to a Directional Action data parameters. The headers and metadata are sent to a Directional Data Plane parameters. Further, the Directional Data Plane parameters and the Directional Action data parameters are sent to the Action code. This Action code further provides headers and metadata as output.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A method for processing data requests from a requester to a responder over a network by using remote direct memory access, the method comprising:
   at a network interface controller, receiving two or more requests from the requester into a work queue of the network interface controller,
   at the network interface controller, executing the two or more requests by sending the two or more requests to the responder, and receiving responses to the two or more requests from the responder,
   wherein one or more given requests each comprises dependency information related to the response from the responder to one or more previous requests in the work queue, the method further comprising, before executing a given request, at least partially evaluating the dependency information, wherein executing the given request depends on a result of the evaluation,
   wherein the dependency information comprises one or more request identifiers for identifying the one or more previous requests in the work queue, and a condition information to be evaluated, and
   wherein the condition information comprises one or more data locations and one or more operations to be executed on data located at one of the one or more data locations in result(s) of the one or more previous requests identified by the one or more request identifiers.

2. The method according to claim 1, wherein at least one of the one or more operations in the condition information includes deriving values from the data located at the one of the one or more data locations in the result of the one of the one or more identified previous requests, or from a combination of data located at the one or more data locations in the result(s) of the one or more identified previous requests, the derived values to be used for the execution of the corresponding given request.

3. The method according to claim 1, wherein the condition information comprises one or more values, to be used in the one or more operations.

4. The method according to claim 3, wherein at least one of the one or more operations in the condition information includes comparing a data located at one of the one or more data locations in the result of one of the one or more identified previous requests, or comparing a combination of data located at the one or more data locations in the result(s) of the one or more identified previous requests, with one of the one or more values in the condition information, or with a combination of two or more of the one or more values in the condition information.

5. The method according to claim 1, wherein, as a given request that comprises dependency information is queued into the work queue of the network interface controller, the dependency information of the given request is extracted from both the given request and from a corresponding previous request that the given request is dependent upon, and the extracted dependency information is stored in a dependency information database.

6. The method according to claim 5, wherein, upon receiving the response to a given request from the responder, the network interface controller queries the dependency information database for dependency information including the request identifier of the given request, and stores the data in the response, located at the data location contained in the queried dependency information, into a dependency response data memory in the network interface controller and/or into a dependency response data memory allocated to the network interface controller in a host.

7. The method according to claim 6, wherein evaluating the dependency information of the given request comprises querying the dependency information database for the dependency information of the given request, obtaining the data stored into the dependency response data memory corresponding to the result of execution of the previous request whose identifier is contained in the queried dependency information, and executing the operations contained in the queried dependency information on the obtained data.

8. A controller for processing data requests from a requester to a responder over a network by using remote direct memory access, the controller being configured to;
   receive two or more requests issued by the requester into a work queue,
   execute the two or more requests by sending the two or more requests to the responder, and receive responses to the two or more requests from the responder,
   wherein one or more given requests each comprises dependency information related to the response from the responder to one or more previous requests in the work queue, the controller being further configured to at least partially evaluate the dependency information, before executing the given request, wherein executing the given request depends on a result of the evaluation, wherein the dependency information comprises one or more request identifiers for identifying the one or more previous requests in the work queue, and condition information, the controller being configured to at least partially evaluate the condition information, and wherein the condition information comprises one or more data locations and one or more operations to be executed on data located at the one or more data locations in the result(s) of one or more of the previous requests identified by the request identifiers, the controller being configured to at least partially execute the one or more operations.

9. The controller according to claim 8, wherein at least one of the one or more operations in the condition information includes deriving values from the data located at one of the one or more data locations in the result of one of the identified previous requests, or from a combination of data located at the one or more data locations in the results of two or more of the identified previous requests, to be used for the execution of the corresponding given request.

10. The controller according to claim 8, wherein the condition information comprises one or more values to be used in the one or more operations.

11. The controller according to claim 10, wherein at least one of the one or more operations in the condition information includes comparing a data located at one of the one or more data locations in the result of one of the identified previous requests, or a combination of the data located at the one or more data locations in the results of the one or more identified previous requests, with one of the values in the condition information, or a combination of two or more of the values in the condition information.

12. The controller according to any of claim 11, further configured to store, in a dependency information database, dependency information extracted from the one or more given requests.

13. The controller according to claim 12, further configured to, upon receiving the responses to the given requests from the responder, query the dependency information database for dependency information comprising the request identifiers of the given requests, and to store the data in the responses, located at the data locations contained in the queried dependency information, into a dependency response data memory in the controller and/or into a dependency response data memory allocated to the controller in a host.

14. The controller according to claim 13, further configured to, before evaluating the dependency information of a given request, query the dependency information database for dependency information of the given request, to obtain the data stored into the dependency response data memory corresponding to the result of execution of the previous requests whose identifiers are contained in the queried dependency information, and to execute the operations contained in the queried dependency information on the obtained data.

15. A requester for sending data requests to a responder through a controller over a network by using remote direct memory access, the requester being configured to issue two or more requests into a work queue of the controller to be executed by the controller by sending the two or more requests to the responder and receiving responses to the two or more requests from the responder, issue one or more given requests that comprise dependency information related to the responses from the responder to one or more previous requests in the work queue, wherein the dependency information is to be evaluated before the given request is to be executed, and the execution of the given request is dependent on a result of the evaluation, wherein the dependency information comprises one or more request identifiers for identifying the one or more previous requests in the work queue, and a condition information, the requester being configured to evaluate at least partially the condition information, and wherein the condition information comprises one or more data locations and one or more operations to be executed on data located at the one or more data locations in the result(s) of the one or more previous requests identified by the request identifiers, the requester being configured to execute at least partially the one or more operations.

16. The requester according to claim 15, wherein at least one of the one or more operations in the condition information includes deriving values from the data located at one of the one or more data locations in the result of one of the identified previous requests, or from a combination of data located at the one or more data locations in the result of one or more of the identified previous requests, wherein the derived values are to be used for the execution of the corresponding given request.

17. The requester according to claim 15, wherein the condition information comprises one or more values, to be used in the one or more of the operations.

18. The requester according to claim 17, wherein at least one of the one or more operations in the condition information includes comparing a data located at one of the one or more data locations in the result of one of the identified previous requests, or on a combination of data located at the one or more data locations in the result of two or more of the identified previous requests, to one of the values in the condition information, or to a combination of two or more of the values in the condition information.

* * * * *